United States Patent [19]
Dixon

[11] Patent Number: 6,131,424
[45] Date of Patent: Oct. 17, 2000

[54] COMBINATION ACCELERATOR AND BRAKE PEDAL LOCKING DEVICE

[76] Inventor: Roy J. Dixon, 230 Las Palmas St., Royal Palm Beach, Fla. 33411

[21] Appl. No.: 09/406,549

[22] Filed: Sep. 27, 1999

[51] Int. Cl.⁷ .................................................. B60R 25/08
[52] U.S. Cl. ............................................ 70/198; 70/237
[58] Field of Search ............................. 70/198–203, 237, 70/238, 245–248, 254

[56] References Cited

U.S. PATENT DOCUMENTS

| | | |
|---|---|---|
| 1,247,512 | 11/1917 | Dobler . |
| 1,343,459 | 6/1920 | Lacy .................................................. 70/199 |
| 1,444,379 | 2/1923 | Jones ................................................ 70/160 |
| 1,527,992 | 3/1925 | Norton .............................................. 70/200 |
| 1,579,395 | 4/1926 | Rohm et al. ...................................... 70/199 |
| 3,613,410 | 10/1971 | Shaw . |
| 4,076,095 | 2/1978 | Adamski .......................................... 70/144 |
| 4,493,198 | 1/1985 | Brown .............................................. 70/203 |
| 4,876,865 | 10/1989 | Trinidad et al. ................................. 70/203 |
| 5,094,092 | 3/1992 | Hseih ............................................... 70/199 |
| 5,282,373 | 2/1994 | Riccitelli ......................................... 70/199 |
| 5,359,868 | 11/1994 | Villani ............................................. 70/203 |
| 5,461,891 | 10/1995 | Noel ............................................ 70/209 X |
| 5,755,125 | 5/1998 | Charette .......................................... 70/226 |
| 5,826,448 | 10/1998 | Graham ........................................... 70/209 |
| 5,845,521 | 12/1998 | Najera ......................................... 70/203 X |
| 5,870,912 | 2/1999 | Vito ............................................. 70/201 X |
| 5,906,121 | 5/1999 | Mankarious ..................................... 70/199 |

*Primary Examiner*—Lloyd A. Gall
*Attorney, Agent, or Firm*—McHale & Slavin, PA

[57] ABSTRACT

A vehicle pedal locking device includes a multi-piece housing assembly having an internal chamber, a two-part sleeve-like pedal engaging member disposed within the housing assembly, and a lock assembly for selectively securing the housing assembly portions in a pedal-securing orientation. Housing assembly portions each include a corresponding portion of the pedal engaging member, and the pedal engaging member pieces secure opposite ends of a selected brake pedal. The lock assembly is key operated and substantially enclosed within the device outer housing. The housing internal chamber substantially surrounds the secured brake pedal and accelerator. With this arrangement, the present invention prevents unwanted pedal operation. The present invention also protects the secured pedals and included lock assembly from abuse and makes unauthorized removal of the device difficult.

5 Claims, 2 Drawing Sheets

COMBINATION ACCELERATOR AND BRAKE PEDAL LOCKING DEVICE

FIELD OF THE INVENTION

This invention is directed to vehicle securing devices and, in particular, to a device that secures the accelerator and brake pedal of a vehicle to prevent theft and unwanted use.

BACKGROUND OF THE INVENTION

A variety of devices exist to secure vehicles against theft and unauthorized use. Many automobile owners will, for example, choose to supplement standard door locks with an electronic alarm. When triggered, these alarms may emit loud sounds and trigger flashing lights; some alarms may even disable a vehicle fuel pump or starter motor. Unfortunately, these devices may be a nuisance if triggered accidently, may be disabled by experienced thieves, and will not operate if the battery is dead.

Other devices secure vehicles by encumbering the vehicle steering wheel. These devices telescopically engage a vehicle steering wheel make the steering wheel difficult to use by striking internal portions of the vehicle as attempts to turn the wheel are made. Unfortunately, these devices may often be defeated by strategically cutting away portions of the steering wheel and simply removing the lock.

Other locking devices use cooperating plates and bars to secure the pedals of a vehicle. U.S. Pat. No. 4,076,095, for example, discloses a pedal locking device that includes a pair of parallel bars which simultaneously sandwich the support stems of an automobile clutch and brake pedal. Integrated spacers keep the bars and the engaged pedals from being depressed while the device is locked in place. Although this type of lock may make driving difficult and could deter inexperienced thieves, the '095 device may be defeated by a determined individual having tools to cut the parallel bars, thereby rendering the device easy to remove. U.S. Pat. No. 5,094,092 also discloses a pedal locking device that uses bars and spacer legs to prevent motion of engaged pedals. As with other devices of this sort, the '092 device is vulnerable to physical attack and may be defeated simply by cutting through exposed portions and removing the device.

Other locking devices resemble specialized clamps and engage a chosen pedal to make the pedal difficult to move. U.S. Pat. Nos. 3,613,410; 4,493,198; and 5,359,868 each discloses an example of this type of device. While these devices may encumber a selected pedal, this type of device does not effectively deter theft in all cases. For example, vehicles having a locked brake pedal may still be driven through use of the accompanying emergency brake. Additionally, vehicles having just an accelerator pedal blocked may be placed in a neutral gear and pushed to a remote location where the lock may be attacked until destroyed.

Thus, what is needed is a pedal locking device that includes advantages of the known devices, while addressing the shortcomings they exhibit. The pedal locking device should protect against theft and unauthorized use of the protected vehicle. The pedal locking device should simultaneously engage brake and accelerator pedals, while enclosing the pedals within a housing to protect the pedals against vandalism. The pedal locking device should include a lock assembly which is adjustable and easy to operate, yet protected by an external housing and difficult to attack. The pedal locking device should also be easy to install and remove. The pedal locking device should secure pedals with an internal pedal engaging member and should substantially enclose the pedals to protect the pedals against vandalism.

SUMMARY OF THE INVENTION

The instant invention is a pedal locking device used to secure pedal-operated vehicles against theft and unauthorized operation. When in place, the present invention prevents access to, and operation of, control pedals of a selected vehicle.

The device includes a rigid outer housing characterized by an internal chamber sized to substantially enclose the accelerator and brake pedal of the selected vehicle. The housing is a two-piece construction including a housing first portion that cooperates with a housing second portion to substantially surround pedals inserted into the housing internal chamber. The housing includes strategically-placed cutouts that accommodate the mounting stems of a host vehicle brake pedal and accelerator pedal.

While in the housing internal chamber, the pedals are restrained by a pedal engaging member. The pedal engaging member resembles an elongated sleeve having two cooperative pieces, each secured to a corresponding portion of the housing. As the device is put into place and the housing portions are brought together, both pieces of the pedal engaging member slide laterally to capture corresponding ends of the brake pedal inserted into the internal chamber.

The outer housing portions are secured together by an adjustable lock assembly, and the lock assembly is protected by the rigid outer housing during use. The lock assembly includes an elongated rod having a contoured outer surface. The elongated rod is attached to the housing first portion selectively secured by a key-operated lock assembly main body which is attached to the housing second portion.

To secure the housing first and second portions, the lock assembly rod is inserted into the lock assembly, and the housing portions are brought together. Once in place, the device substantially encloses the secured pedals and the lock assembly.

Thus it is an objective of the instant invention to provide a pedal locking device that protect a vehicle against theft and unauthorized use of the protected vehicle.

An additional objective of the present invention is to provide a pedal locking device that locks pedals in place and surrounds the secured pedals to protect against vandalism.

Yet another objective of the present invention is to provide a pedal locking device that simultaneously engage brake and accelerator pedals.

A further objective of the present invention is to provide a pedal locking device having a lock assembly which is adjustable and easy to operate, yet protected by an external housing and difficult to attack.

Still an additional objective of the present invention is to provide a pedal locking device having a lock assembly that is easy to install and remove.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
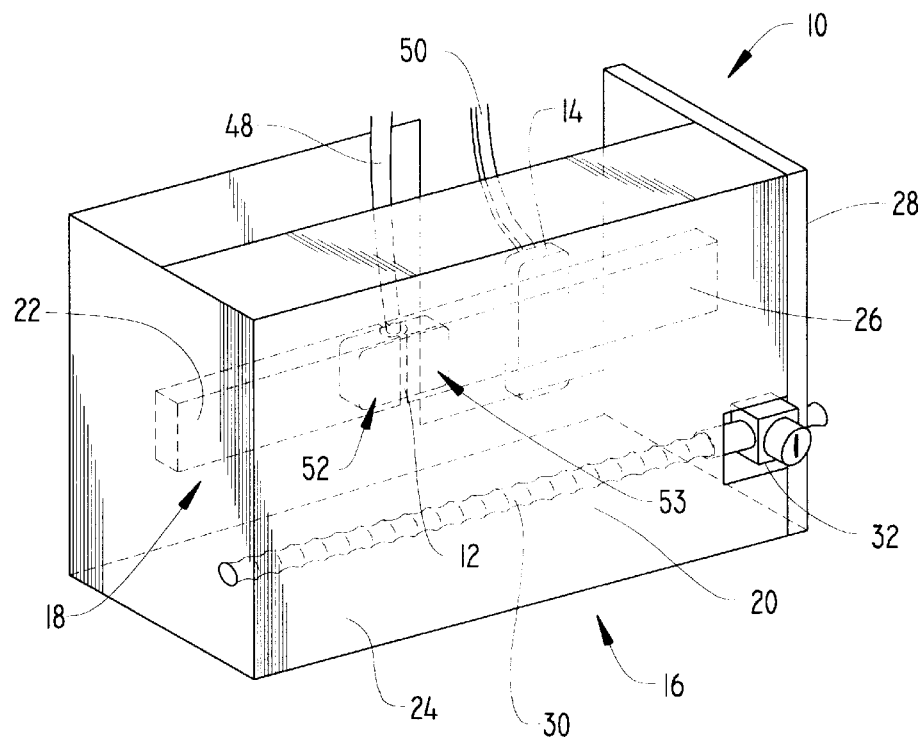
FIG. 1 is a pictorial view of the pedal locking device of the present invention, shown in use to secure a brake pedal and an accelerator pedal.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

Now with reference to FIG. 1, the pedal locking device 10 of the present invention is shown in use to prevent movement of an automobile brake pedal 12 and accelerator pedal 14. By way of overview, the pedal locking device 10 includes a rigid outer housing assembly 16, a pedal engaging member 18, and an adjustable housing lock assembly 20. As will be discussed more fully below, the housing assembly 16 is a two-piece construction, including a housing first portion 24 that cooperatively engages a housing second portion 28. A first portion 22 of the pedal engaging member 18 is secured to the housing first portion 24, and a second portion 26 of the pedal engaging member is secured to the housing second portion 28. The housing portions 24,28 are selectively secured together by cooperative interaction of first and second portions 30,32 of the housing lock assembly 20. Locking the housing portions 24,28 together places the pedal engaging member portions 22,26 in a pedal securing orientation. The details of the pedal locking device 10 of the present invention will now be discussed.

Figure 2:
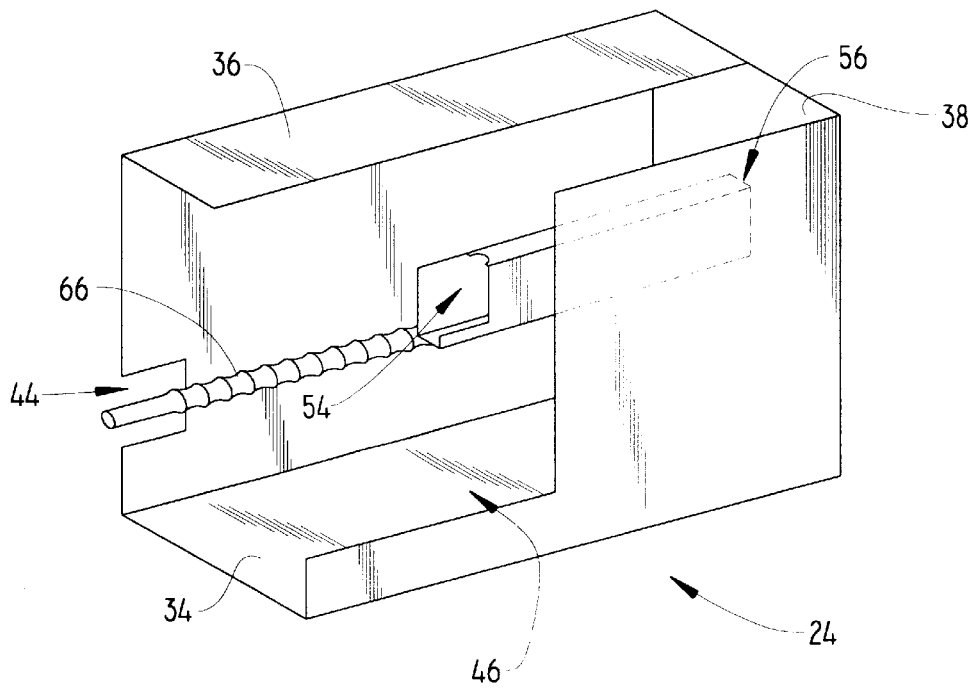
FIG. 2 is a rear perspective view of the housing assembly first portion shown in FIG. 1.

With reference to FIG. 2, the first portion 24 of the rigid housing 16 resembles a five-sided sleeve. More particularly, the housing first portion 24 includes a bottom wall 34 spaced apart from a top wall 36 by an end wall 38, a back wall 40, and a front wall 42. In a preferred embodiment, the front wall 42 is characterized by a lock passthrough notch or aperture 44 that accepts the lock assembly second portion 32 when the device 10 is in a pedal securing orientation. The back wall 40 includes a pedal passthrough cutout 46 that accepts the accelerator pedal 14 when the device is in place. With continued reference to FIG. 2, the top wall 36 preferably has the same width as the bottom wall 34, but is only approximately half as deep. As shown in FIG. 1, this arrangement allows the housing assembly first portion 24 to accommodate the connector stems 48,50 of the brake and accelerator pedals 12,14 when the device 10 is in place.

As noted above, the first portion 22 of the pedal engaging member 18 is mounted within the housing first portion 24. In a preferred orientation, the pedal engaging member first portion 22 is sized and positioned to engage a brake pedal first end 52 when the device 10 is in a pedal securing orientation. With continued reference to FIG. 2, the pedal engaging member first portion 22 is a substantially-hollow sleeve characterized by a contoured free end 54 shaped to fittingly engage the brake pedal first end 52. The pedal engaging member first portion 22 also includes an attached end 56 disposed against the housing first portion end wall 38; additionally, the free end 54 of the pedal engaging member first portion 22 may engage the brake pedal connector stem 48.

Now with reference to FIG. 3, the housing second portion 28 will now be described. In a preferred embodiment, the housing second portion 28 includes an end panel 58 and a collection of positioning tabs 60,62,64 that extend orthogonally therefrom. A top positioning tab 60 is oriented to engage the top wall 36 of the pedal engaging member first portion 22 when the housing portions 24,28 are secured in the pedal securing orientation. A pair of middle positioning tabs 62 is oriented to engage the front wall 42 of the housing first portion 24 when the housing portions 24,28 are secured together. A bottom orienting tab 64 is oriented to engage the bottom wall 34 of the housing first portion 24 when the housing portions 24,28 are secured together.

Figure 3:
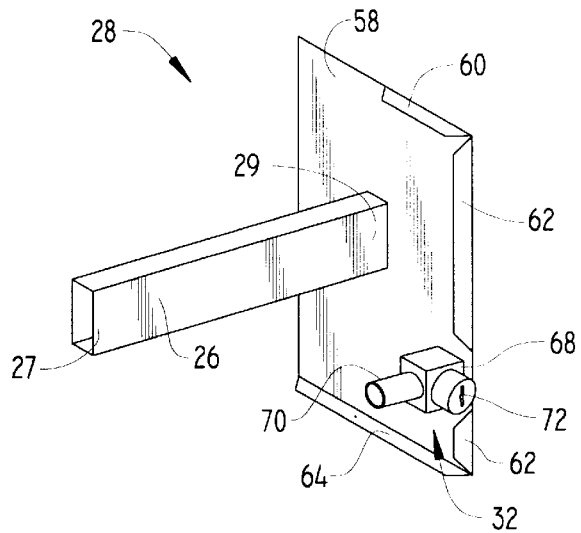
FIG. 3 is a front perspective view of the housing assembly second portion shown in FIG. 1.
Figure 4:
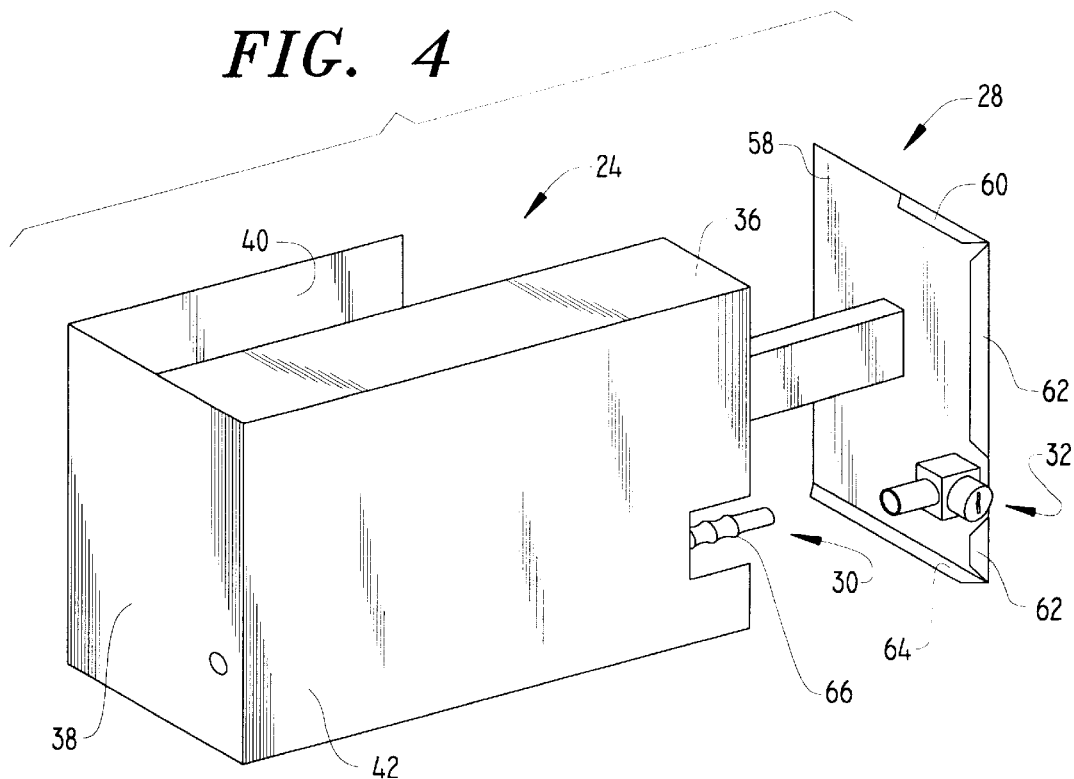
FIG. 4 is a pictorial view of the housing portions of the present invention shown in a spaced-apart orientation.

With continued reference to FIG. 3, the pedal engaging member second portion 26 is a substantially-hollow sleeve characterized by a free end 27 and an attachment end 29. In a preferred embodiment, the free end 27 is sized and shaped to fittingly engage a brake pedal second end 53. With this arrangement, both ends 52,53 of the brake pedal 12 are engaged by the pedal engaging member 18 while the device 10 is in the pedal securing orientation. As a result, the pedal locking device 10 of the present invention advantageously prevents movement of, and access to, the brake and accelerator pedals 12,14 of a selected vehicle.

With joint reference to FIGS. 2 and 3, the housing lock assembly 20 will now be described. As noted above, the housing lock assembly 20 includes a first portion 30 attached to the housing first portion 24 and a second portion 32 attached to the housing second portion 28. In a preferred embodiment, the lock first portion 30 is an elongated, rigid rod having a contoured outer surface 66 sized and shaped for selective securement by the lock second portion 32. The lock second portion 32 preferably includes a lock main body 68, an insertion sleeve 70, and a key way 72. The insertion sleeve 70 guides the lock first portion 30 into the lock main body 68 as the housing portions 24,28 are brought together. Once guided into the lock main body 68, interaction between the lock first portion outer surface 66 and the lock main body prevents separation of the housing second portion 28 from the housing first portion 24. The housing lock assembly may be unlocked to allow separation of the housing portions 24,28 by a key, not shown, inserted into the key way 72.

In keeping with the objectives of the present invention, the lock assembly 20 is substantially enclosed within the rigid outer housing 16 when the device 10 is in the pedal locking orientation. With this arrangement, the housing assembly 16 advantageously not only prevents access to the secured pedals 12,14, but also makes the lock assembly 20 resistant to vandalism and prevents attempts to cut through the lock assembly.

Although the invention has been described in terms of a specific embodiment, it will be readily apparent to those skilled in this art that various modifications, rearrangements and substitutions can be made without departing from the spirit of the invention. The scope of the invention is defined by the claims appended hereto.

What is claimed is:

1. A pedal locking device comprising:
   a rigid housing construction characterized by an internal chamber sized to substantially surround an accelerator and a brake pedal of a vehicle, said housing construction including a first portion and a cooperative second portion;
   a pedal engaging member disposed within said internal chamber defined as a sleeve adapted to receive a foot-contactable portion of a control pedal therein and prevent relative motion between said pedal and said housing construction, said pedal engaging member being adapted to engage said brace pedal; and a lock assembly operatively associated with said housing portions, said lock assembly being adapted to selectively maintain said housing portions and said pedal engaging member in a securing orientation, said lock assembly being substantially enclosed within said internal chamber when said housing portions are in said securing orientation.

2. The pedal locking device according to claim 1 wherein: said lock assembly includes a contoured rod disposed on said housing construction first portion and a main body disposed on said housing construction second portion, said main body being adapted to selectively engage said contoured rod.

3. The pedal locking device according to claim 1 wherein: said housing construction second portion includes at least one positioning tab extending from a second end wall, said at least one tab being adapted to engage a corresponding wall of said housing construction first portion.

4. A pedal locking device comprising:

a rigid housing construction characterized by an internal chamber sized to substantially surround an accelerator and a brake pedal of a vehicle, said housing construction including a first portion and a second portion, said first portion having a first end wall, a bottom wall, a front wall characterized by a first passthrough aperture, a back wall characterized by a second passthrough aperture, and a top wall characterized by a third passthrough aperture; said housing construction second portion includes a second end wall;

a pedal engaging member disposed within said internal chamber, said pedal engaging member being adapted to engage said brake pedal; and a lock assembly operatively associated with said housing portions, said lock assembly being adapted to selectively maintain said housing portions and said pedal engaging member in a securing orientation, said lock assembly being substantially enclosed within said internal chamber when said housing portions are in said securing orientation.

5. The pedal locking device according to claim 4 wherein said housing construction second portion includes at least one positioning tab extending from said second end wall, said at least one tab being adapted to engage a corresponding wall of said housing construction first portion.

* * * * *